United States Patent

Nakamura et al.

[11] 4,068,926
[45] Jan. 17, 1978

[54] LIQUID CRYSTAL DISPLAY DEVICE FOR DISPLAYING COLORED PATTERNS

[75] Inventors: Kenji Nakamura, Kamakura; Iwao Seno, Toyonaka, both of Japan

[73] Assignee: Japan Suncrux Co., Ltd., Tokyo, Japan

[21] Appl. No.: 586,897

[22] Filed: June 16, 1975

[30] Foreign Application Priority Data

Nov. 13, 1974 Japan .................................. 49-137348
Nov. 13, 1974 Japan .................................. 49-137349

[51] Int. Cl.² .................................................. G02F 1/13
[52] U.S. Cl. ................................ 350/160 LC; 350/155
[58] Field of Search ............... 350/150, 160 LC, 148, 350/154, 155

[56] References Cited

U.S. PATENT DOCUMENTS

| 3,731,986 | 5/1973 | Ferguson ........................ 350/150 |
| 3,806,227 | 4/1974 | Greubel et al. ................. 350/150 |

OTHER PUBLICATIONS

Scheffer: "New Multicolor Liquid Crystal Displays...", Journal of Applied Physics, vol. 44, Nov. 1973.

*Primary Examiner*—Edward S. Bauer

[57] ABSTRACT

A twisted nematic type color liquid crystal display device comprises a twisted nematic liquid crystal cell sandwiched between a pair of linear polarizers. One of the linear polarizers is achromatic and the other is colored. The colored linear polarizer should preferably be doubled to increase contrast of the patterns displayed thereby.

6 Claims, 2 Drawing Figures

LIQUID CRYSTAL DISPLAY DEVICE FOR DISPLAYING COLORED PATTERNS

BACKGROUND OF THE INVENTION

1. Field of the Invention

This invention relates to a liquid crystal display device, and more particularly to a liquid crystal display device for displaying colored patterns by use of a twisted nematic type liquid crystal cell.

2. Description of the Prior Art

It has been known in the art to utilize a liquid crystal material for display purposes. Particularly, a twisted nematic type liquid crystal cell has often been employed in liquid crystal display devices. The liquid crystal display devices employing a twisted nematic type liquid crystal cell have been used as digital display devices for electronic clocks or watches, electronic desk calculators, electronic computers, measuring instruments and so forth. A liquid crystal display device of this type is provided with a liquid crystal cell which comprises a pair of oppositely disposed transparent front and rear substrates bearing on the inside surface thereof a patterned conductive electrode layer, and a nematic-phase liquid crystal material having positive dielectric anisotropy filling the space therebetween. The space between the substrates, i.e., the thickness of the liquid crystal cell, is normally 1 to 50 microns. As the nematic-phase liquid crystal material, a material having positive dielectric anisotropy such as p-n-hexylbenzylidene-p'-cyanoaniline, is employed. The inside surfaces of the transparent substrates are rubbed at right angles to each other so as to effect a twisted nematic structure. Outside and adjacent the front and rear substrates are provided crossed linear polarizers to constitute a liquid crystal display assembly which transmits light therethrough when no electric field is applied across the liquid crystal cell. The transmittivity of collimated light through the twisted nematic type liquid crystal cell between crossed linear polarizers is decreased as a function of the strength of the electric field applied across the liquid crystal cell. In the absence of an electric field, an observer observing the device in the direction normal to the plane of the substrates and parallel to the normal optical axis will observe that the field of view is extinguished only if the direction of vibration (direction of linear polarization) of one linear polarizer is parallel to that of the other. It will be understood by those skilled in that art that the transmittivity of collimated light through the liquid crystal display assembly employing a twisted nematic type liquid crystal cell is increased as a function of the strength of the electric field applied across the liquid crystal cell when the linear polarizers disposed outside and adjacent the transparent substrates are oriented in parallel to each other. By rotating one polarizer by 90° with respect to the other linear polarizer about the optical axis of the liquid crystal cell, the image-background combination of the displayed pattern is reversed from dark-on-light to light-on-dark or vice versa.

The pair of linear polarizers disposed adjacent the transparent substrates are achromatic (e.g. L-81-18 made by Sanritsu Denki K.K.), and accordingly, the image-background combination of the pattern displayed by the above described display devices is limited to dark-on-light or light-on-dark. However, since the sense of sight is more sensitive to change in color than change in liminosity, it is desired to make a color display, i.e., to change dark-on-light (or light-on-dark) image-background combination to colored-on-light or dark-on-colored (or colored-on-dark or light-on-colored) combination.

It has been known in the art to provide a liquid crystal display device which makes a colored display. One example of such a display device is disclosed in Japanese Utility Model Public Disclosure No. 27474/1974. In this color display device, a color filter is disposed in front of or behind the display assembly comprising a liquid crystal cell and a pair of linear polarizers, or between the cell and one of the linear polarizers to make the whole area of the display face colored.

In the above-described conventional color liquid crystal display devices for displaying colored patterns, the display face is colored in the color of the filter disposed therein with the liquid crystal cell becomes transparent, e.g. when the twisted nematic type liquid crystal cell is sandwiched between a pair of crossed polarizers and no electric field is applied thereacross, and the display face is darkened when the liquid crystal cell becomes opaque. Therefore, the image-background combination displayed thereby is limited to dark-on-colored or colored-on-dark. Therefore, the recognizability of the pattern displayed thereby is not enhanced except when the color of the filter is yellow which results in the highly recognizable contrast of black-and-yellow.

Further, in the above-described conventional color liquid crystal display devices for displaying colored patterns, the quantity of light transmitting through the liquid crystal display assembly including the color filter is decreased by absorption of light by the filter, which results in reduction in contrast of pattern displayed thereby.

In addition, the thickness of the liquid crystal device is increased by the provision of said color filter. Accordingly, the above-described color liquid crystal display devices including a color filter are particularly undesirable for electronic wrist watches which are required to be as thin as possible.

SUMMARY OF THE INVENTION

In view of the above described defects inherent in the conventional color liquid crystal display devices, the primary object of the present invention is to provide a liquid crystal device for displaying colored patterns which is capable of displaying patterns having light-on-colored or colored-on-light image-background combination which are highly recognizable.

Another object of the present invention is to provide a liquid crystal device for displaying colored patterns in which the quantity of light transmitting through the display assembly is not decreased and accordingly the contrast of the patterns displayed thereby is not lowered.

Still another object of the present invention is to provide a liquid crystal device for displaying colored patterns which has a thickness as small as that of the conventional liquid crystal display device for displaying achromatic patterns.

A further object of the present invention is to provide a color liquid crystal device which displays colored patterns of even higher contrast than those of the conventional liquid crystal display device for displaying achromatic patterns.

A still further object of the present invention is to provide a color liquid crystal display device in which the color of the patterns displayed thereby can be selected among various colors made by combinations of two colors of the existing colored polarizers.

The above objects are accomplished by replacing one of the pair of achromatic linear polarizers disposed adjacent the transparent substrates with a colored linear polarizer. The achromatic polarizer to be replaced with the colored linear polarizer may be either the one disposed in front of the liquid crystal cell or the one disposed behind the cell. It is practically undesirable to replace both achromatic linear polarizers with colored linear polarizers, since the contrast of the patterns displayed thereby is considerably lowered by the colored linear polarizers of low linear polarization performance.

The liquid crystal display device in accordance with the present invention displays colored patterns which have light-on-colored or colored-on-light image-background combination, since the display face of the device becomes colorless when the display assembly becomes transparent, and is colored by the colored linear polarizer when the display assembly becomes opaque.

In a preferred embodiment of the present invention, two colored linear polarizers are superposed on one side of the liquid crystal cell to double the linear polarization effect and give variety to the color of the pattern displayed thereby.

DESCRIPTION OF THE PREFERRED EMBODIMENTS

Figure 1:
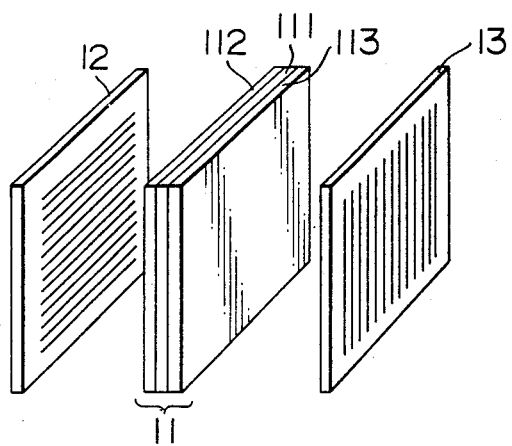
FIG. 1 is an exploded perspective view of an embodiment of the liquid crystal display device for displaying colored patterns in accordance with the present invention.

Referring to FIG. 1, the liquid crystal display device in accordance with one embodiment of the present invention comprises a twisted nematic type liquid crystal cell 11 composed of a pair of oppositely disposed transparent substrates 112 and 113 bearing on the inside surface thereof a patterned electrode layer and a layer of nematic liquid crystal material 111 sandwiched between the pair of transparent substrates 112 and 113, and a pair of crossed linear polarizers 12 and 13 disposed outside and adjacent the liquid crystal cell 11. The linear polarizer will hereinbelow referred to simply as "polarizer" in this application.

The liquid crystal material forming the layer 111 sandwiched between the substrates 112 and 113 is of nematic type having positive dielectric anisotropy such as p-n-hexylbenzylidene-p'-cyanoaniline. The space between the oppositely disposed transparent substrates 112 and 113 is 1 to 50 microns. The inside surfaces of the transparent substrates 112 and 113 sandwiching the layer of nematic liquid crystal material 111 therebetween are rubbed or provided with oblique incidence deposition of inorganic material such as SiO at right angles to each other so as to effect a twisted nematic structure.

One of said polarizers 12 and 13 is achromatic and the other is colored. The achromatic polarizer is generally made by impregnating a thin film of polyvinyl alcohol (PVA) of a thickness of about 10 to 20 microns with an iodide, drying the same, rolling the same in one direction, and adhering a protective film or films of acetate or polyester of a thickness of about 10 to 500 microns to the surface or surfaces of the same. As commercially available polarizers of this type are known, for instance, L-81-18 made by Sanritsu Denki K.K., Japan, HN42 made by Polaroid Corporation, TRANSFER FILM XA and TRANSFER FILM XB made by Marks Polarized Corporation.

The colored polarizer is generally made by impregnating a thin film of polyvinyl alcohol (PVA) of a thickness of about 10 to 20 microns with a dye of desired color, drying the same, rolling the same in one direction, and adhering a protective film or films of acetate or polyester of a thickness of about 10 to 500 microns to the surface or surfaces of the same. As commercially available polarizers of this type are known, for instance, CR-20 (red), CO-20 (orange), CY-20 (yellow), CG-20 (green), CB-20 (blue) and CP-20 (purple) made by Sanritsu Denki K.K., Japan, and HACP24 (amber) HGCP21 (green) and HRCP7 (red) made by Polaroid Corporation.

In operation of the above-described embodiment of the liquid crystal display device, the display face becomes colorless when the liquid crystal cell 11 is not applied with an electric field and made transparent, and is colored in the color of the colored polarizer when the cell 11 is applied with an electric field and made opaque. Accordingly, a colored-on-light or light-on-colored image-background combination is effected in the patterns displayed by this display device.

In the above-described first embodiment of this invention in which a twisted nematic type liquid crystal cell is sandwiched between an achromatic polarizer and a colored polarizer, the contrast of the patterns displayed thereby is somewhat lowered owing to the lowered polarization performance of the colored polarizer. In addition, in the above-described first embodiment of this invention, the color of the displayed pattern is limited to the color of the colored polarizers which are commercially available.

The above defects inherent in the first embodiment of the present invention are eliminated in the second embodiment thereof as described hereinbelow and illustrated in FIG. 2.

Figure 2:
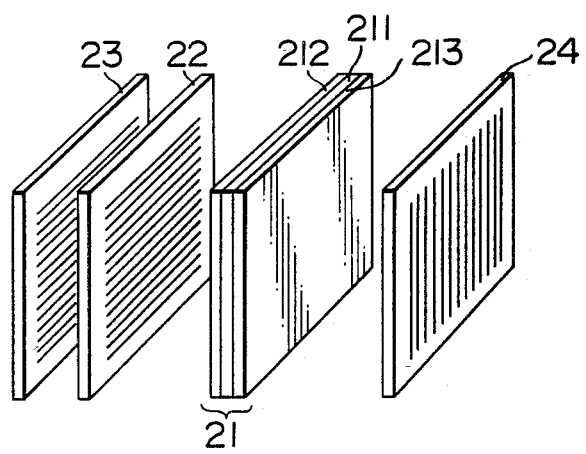
FIG. 2 is an exploded perspective view of another embodiment of the liquid crystal display device of this invention in which two colored linear polarizers are superposed.

Referring to FIG. 2, the liquid crystal display device in accordance with the second embodiment of the present invention comprises a twisted nematic type liquid crystal cell 21 composed of a pair of oppositely disposed transparent substrates 212 and 213 bearing on the inside surface thereof a patterned electrode layer and a layer of nematic liquid crystal material 21 sandwiched between the pair of transparent substrates 212 and 213, a pair of superposed colored polarizers 22 and 23 with the polarizing planes thereof oriented in parallel to each other disposed on one side of said liquid crystal cell 21, and an achromatic polarizer 24 disposed on the other side of said cell 21 with the polarizing plane thereof oriented at right angles to that of said colored polarizers 22 and 23. The colored polarizers 22 and 23 may simply be superposed with each other or adhered to each other with an adhesive. The color of the two colored polarizers 22 and 23 may be the same or different from each other. If colored polarizers of different colors are used for the superposed colored polarizers 22 and 23, various colors different from the commercially available colors can be obtained.

In the above-described liquid crystal display device as shown in FIG. 2, the polarization effect of the colored polarizers is doubled since the polarizing planes of the superposed colored polarizers 22 and 23 are in parallel to each other. Accordingly, the contrast of the patterns displayed thereby is markedly increased.

According to the inventors' experiments, the ratio of contrast of the patterns displayed by the display device in accordance with the second embodiment of the invention was about 11:1, whereas the ratio in case of the first embodiment was about 7:1. In view of the fact that the ratio of contrast in case of the conventional twisted nematic type liquid crystal display device which displays achromatic patterns by use of a pair of achromatic polarizers is about 10:1, it can be said that the colored patterns displayed by the second embodiment of this invention are highly recognizable.

In practical use of the second embodiment of this invention, it is desired to use a light source such as a lamp to brighten the display face, since the brightness of the display face is lowered by the doubled colored polarizers which attenuate the light transmitting through the display assembly and lower the apparent contrast of the pattens displayed thereby. The light source is located behind or in front of the display assembly depending upon the type of the display device, i.e., transmission type or reflection type. (In case of the reflection type, the light source is located in front of, i.e., on the observer's side of, the display assembly.)

We claim:

1. A liquid crystal display device of twisted nematic structure which displays colored patterns comprising in combination:
   a pair of spaced apart oppositely disposed transparent substrates bearing on the inside surfaces thereof a patterned electrode layer,
   a layer of nematic liquid crystal material having positive dielectric anisotropy sandwiched between said pair of transparent substrates,
   means for effecting a twisted nematic structure in the layer of nematic liquid crystal material,
   an achromatic linear polarizer disposed outside and adjacent one of said pair of transparent substrates,
   a first colored linear polarizer disposed outside and adjacent the other of said pair of transparent substrates, and
   a second colored polarizer superposed with the first colored linear polarizer with the polarizing plane thereof oriented in parallel to that of the latter.

2. A liquid crystal display device as claimed in claim 1 wherein the color of the second colored linear polarizer is the same as that of the first colored linear polarizer.

3. A liquid crystal display device as claimed in claim 1 wherein the color of the second colored linear polarizer is different from that of the first colored linear polarizer.

4. A liquid crystal display device as claimed in claim 1 wherein the polarizing plane of said achromatic linear polarizer is oriented at right angles to that of said first and second linear colored polarizers.

5. A liquid crystal display device as claimed in claim 1 wherein the polarizing plane of said achromatic linear polarizer is oriented in parallel to that of said first and second colored linear polarizers.

6. A liquid crystal display device as claimed in claim 1 further comprising a light source disposed outside of said achromatic linear polarizer or outside of said colored linear polarizers.

* * * * *